Figure 3:
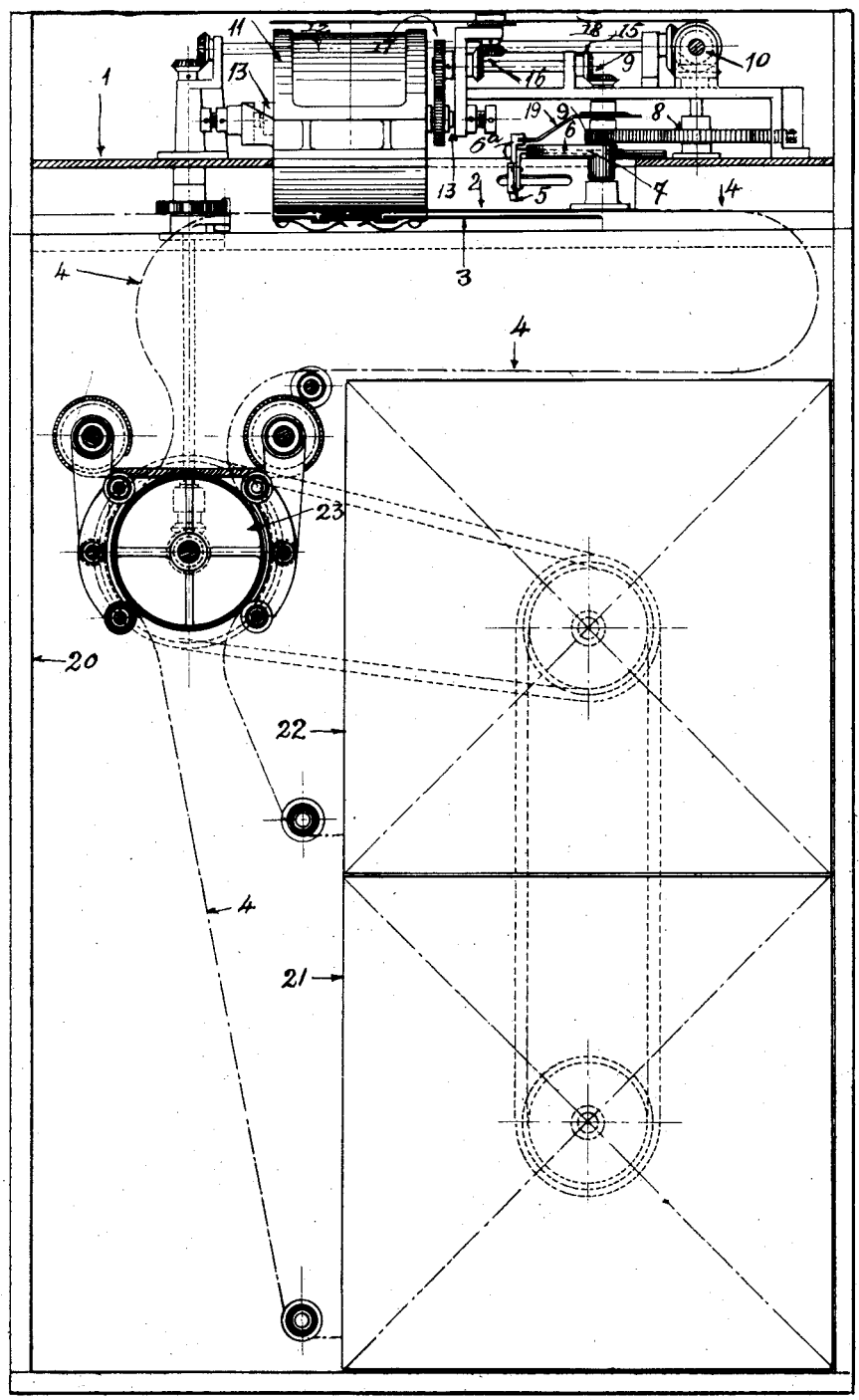

F. ALBERINI.
APPARATUS FOR TAKING CINEMATOGRAPHIC PHOTOGRAMS.
APPLICATION FILED JAN. 6, 1914.
1,196,066.
Patented Aug. 29, 1916.
3 SHEETS—SHEET 1.
Fig. 1
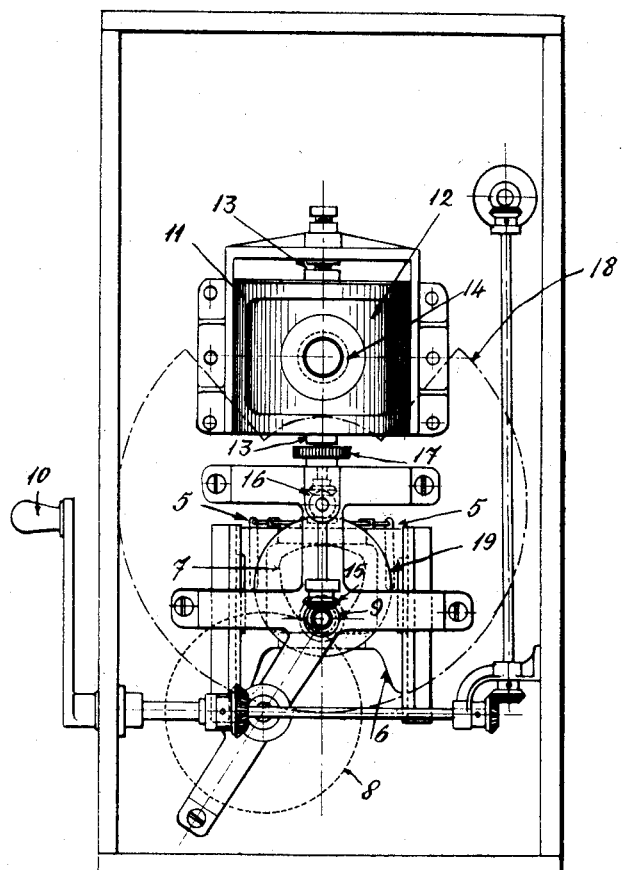
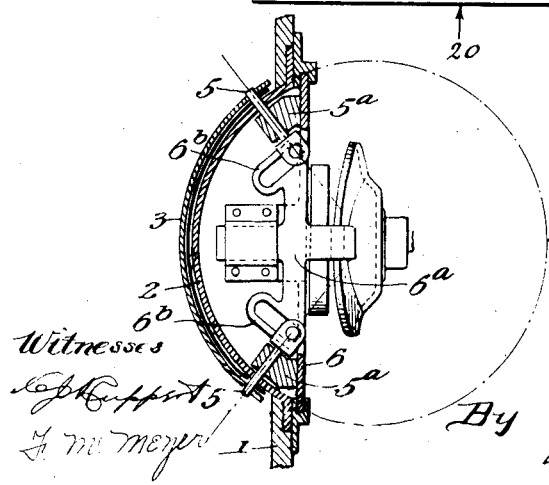
Fig. 4.
F. Alberini

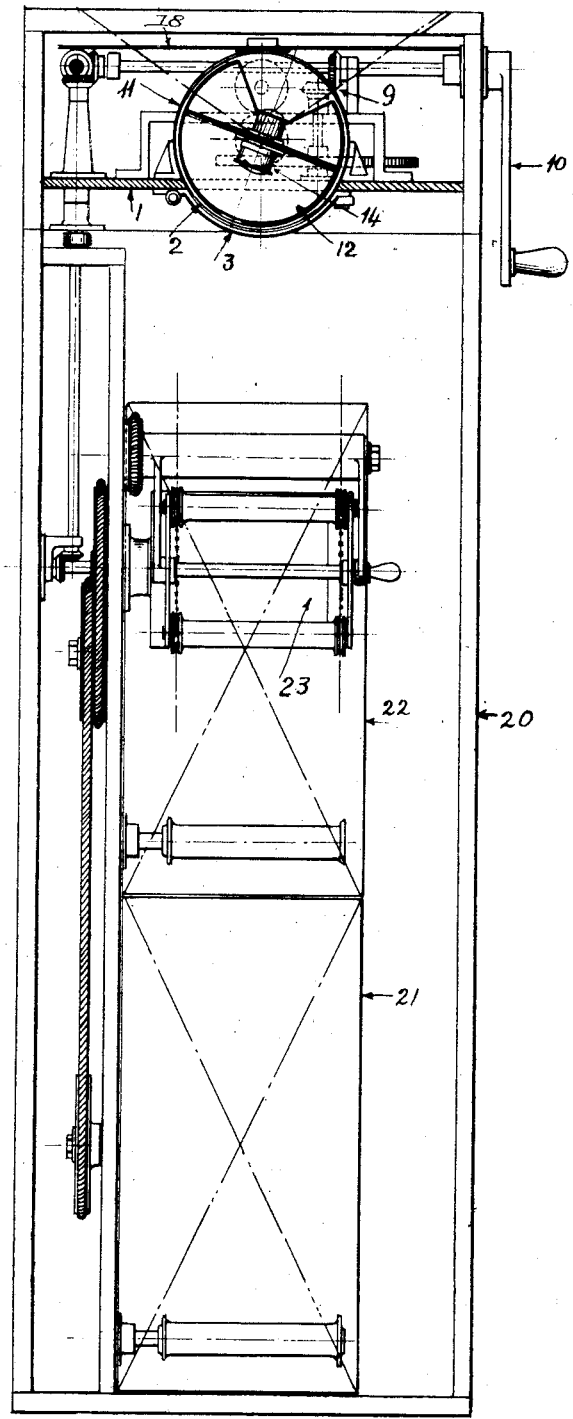

UNITED STATES PATENT OFFICE.

FILOTEO ALBERINI, OF ROME, ITALY.

APPARATUS FOR TAKING CINEMATOGRAPHIC PHOTOGRAMS.

1,196,066. Specification of Letters Patent. Patented Aug. 29, 1916.

Application filed January 6, 1914. Serial No. 810,606.

*To all whom it may concern:*

Be it known that I, FILOTEO ALBERINI, a subject of the King of Italy, and residing at 45 Piazza delle Terme, in Rome, in the Kingdom of Italy, have invented certain new and useful Improvements in Apparatus for Taking Cinematographic Photograms, of which the following is a specification, reference being had therein to the accompanying drawing.

With the apparatus for taking cinematographic photograms as hitherto used only photograms having an angular width of about 45 degrees may be obtained. The action is therefore restricted to a relatively small field.

The apparatus according to the present invention permits the obtaining of an uninterrupted and indefinite series of cinematographic photograms of an angular width above the usual, viz., of about 100 degrees and more.

The apparatus differs from the known apparatus for taking living pictures through the arrangement of the film and of the optical device (objective). While in the known devices of this type the film travels intermittently in a plane position in front of the immovable objective, provision has been made in the apparatus according to this invention that the film should travel intermittently in a curved or bent position in front of an optical device rotating concentrically with the curve of the film.

The annexed drawing shows the device forming the object of the invention, Figure 1 being a front elevation, Fig. 2 a plan view and Fig. 3 a side elevation thereof. Fig. 4 is a view illustrating the film engaging pins.

The mechanism comprising my invention is contained within a casing 20 which is provided at one end with an aperture for receiving the rays of light. A partition 1 is further provided in the casing near the front thereof and forms a chamber with the front wall of the casing for containing the film feeding and exposing mechanism. An apertured plate 2, formed with a transverse curve which corresponds to the arc of a circle is fastened to the partition and is adapted to close an opening formed therein. A removable gate 3 which is curved to correspond with the plate 2, is held by a resilient member against said plate, and the film is caused to travel between the gate and the plate in a manner to be later described.

A frame 6 is mounted to slide vertically in guides secured to the partition, and pins 5 are slidably mounted in bearings $5^a$ which are formed on the plate 6. A cam plate $6^a$ is mounted for horizontal movement in a suitable bearing and is provided with slotted portions $6^b$, to receive the bifurcated ends of the pins 5.

The pins 5 are adapted to enter vertical slots in the plate 2, and engage into the marginal perforations of the film, and to that end are arranged radially with relation to the curvature of the plate 2, thereby permitting the pins to enter the film perforations in a line at right angles to the film surface at the point of entrance.

The frame 6 receives a reciprocating motion through a triangular eccentric 7 actuated by a toothed gearing 8, 9 driven by a crank handle 10. Above the pins 5—5 is arranged an immovable drum 11 and an inner mobile drum 12 rotatable on central supports 13. The mobile drum has suitably fastened in it a photographic objective 14. A toothed gearing 15, 16, 17 driven through the gearing 8, 9 transmits a rotary motion to the mobile drum and thus also to the objective. Both in the immovable and in the mobile drum are provided openings setting up the passage of the light through the objective in relation to its motion which is associated with the motion of the obturator 18 driven through the gear 16.

The pins 5, 5 are arranged so as to engage during their downward course the usual holes provided along the borders of the film and to advance the film for a given space which is controlled by the triangular eccentric 7, while during their upward course they are disengaged from the holes in the film by means of a second eccentric 19, so as to make a free or idle course.

The intermittent movement of the film is in a fixed relation to the passage of the light through the objective, so that when the film stands still and the teeth make their idle course, the objective will impress during its rotary motion the sensitized surface of the film for a sector corresponding to the degrees of the desired angular width.

As these operations are connected between them and are obtained through the sole medium of the motion transmitted from the crank handle 10, the single cinematographic photograms or series of photograms will be registered in a perfectly regular way.

In the housing 20 are arranged two boxes 21, 22, of which one contains, and the other receives, the film.

A toothed drum or transporter 23 regulates the tension of the film during its travel.

What I claim is:

1. A moving picture camera having a rotatable lens, means for imparting a transverse bend to the film at the point of exposure thereof, and means for feeding the film.

2. A moving picture camera having means for imparting a transverse bend to the film at the point of exposure thereof, a rotatable lens adapted to rotate coincident with and parallel to the film curvature, and means for feeding the film.

3. A moving picture camera having a rotatable shutter provided with oppositely disposed alined openings, a lens in the shutter in line with the openings, means for imparting a temporary transverse curvature to the film at the point of exposure thereof, and means for feeding the film.

4. A moving picture camera having a rotatable lens, means for imparting a temporary transverse bend to the film at the point of exposure, and means for engaging the film to intermittently move the same comprising diverging pins for engaging the marginal perforations of the film, means for simultaneously reciprocating the pins to cause engagement and disengagement thereof with the film, and means for imparting a reciprocating movement to the pins parallel with the film to shift the film for each exposure.

5. The combination in a moving picture camera including a casing, and intermittent film feeding mechanism, of a rotatable lens, means for imparting a transverse curvature to a restricted portion of the film at the exposing point thereof, the curvature being in the form of an arc having the lens for its true center so as to bring all parts of the film surface within the focus of the lens, means for rotating the lens, and means for obstructing the passage of light to the lens when the refractive position of the lens is reversed.

6. The combination in a moving picture camera including a casing and an intermittent film feeding mechanism, of a lens adapted to rotate in a plane which is at right angles to the direction of film travel, means for imparting a transverse bend to the film at the point of exposure thereof, means for rotating the lens completely during one combined period of film stoppage and movement, and means for obstructing the passage of light to the lens during the moving period of the film.

7. A moving picture camera for taking wide angle pictures, including a casing, a lens adapted to be rotated in a plane at right angles to the direction of film travel, means for imparting a transverse bend to a restricted portion of the film so as to bring all points of its curved surface within the focus of the lens, means for intermittently feeding the film through the bending means, means for rotating the lens, and means for obstructing the passage of light to the lens when the refractive position thereof is reversed.

8. The combination in a moving picture camera including a casing, of a rotatable cylinder provided with diametrically opposed openings, a lens fixedly mounted in the center of the cylinder and in alinement with the openings, a stationary cylinder surrounding the first mentioned cylinder, diametrically opposed openings in the stationary cylinder, means for feeding a film past one of the openings in the stationary cylinder, means for pressing the film against the cylinder to impart a corresponding curved bend thereto and thereby bring all points of the film surface in the focus of the lens during its rotation, means for rotating the rotatable cylinder so as to cause alinement of all the openings for a portion of its revolution, and means for causing occultation of the lens during the remainder of the revolution.

9. The combination in a moving picture camera including a casing, of an axially rotatable cylinder, a longitudinal diametrical partition therein, a lens casing mounted in the partition and at right angles thereto, a relatively wide angle shaded light entrance provided in the cylinder adjacent one end of the lens casing, said cylinder being further provided with a narrow longitudinal slot at a point opposite the other end of the lens casing, a stationary cylinder surrounding the movable cylinder provided with large diametrically opposed openings, means for feeding a film past one of said large openings, a curved gage which is adapted to press the film against the side of the stationary cylinder to form a transverse bend therein conforming to the surface of the cylinder, means for rotating the first cylinder, and means for occulting the lens during a portion of its revolution.

In testimony whereof I have signed my name in the presence of two subscribing witnesses the 22nd day of December 1913.

FILOTEO ALBERINI.

Witnesses:
GIOVANUI VALATELLI,
CORELLA FONTANI.